(No Model.) 4 Sheets—Sheet 1.
S. D. STROHM.
ELECTRICAL CABLE.
No. 289,166. Patented Nov. 27, 1883.
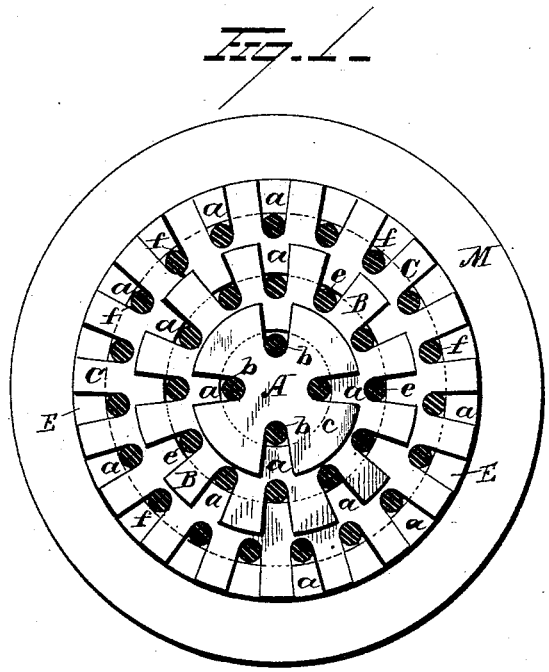
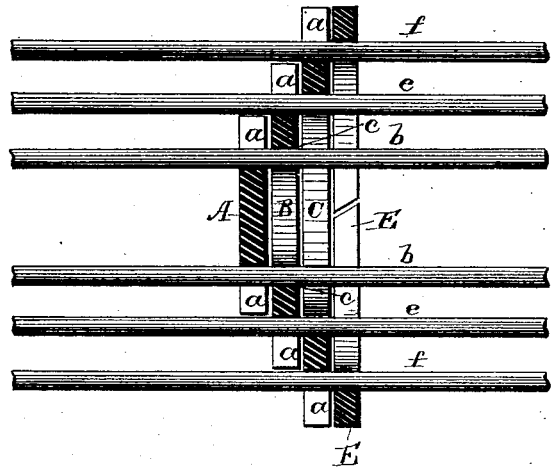
WITNESSES
Herman Moran.
A. W. Bright.
INVENTOR
Samuel D. Strohm.
By H. A. Seymour,
ATTORNEY (No Model.) 4 Sheets—Sheet 2.
S. D. STROHM.
ELECTRICAL CABLE.
No. 289,166. Patented Nov. 27, 1883.
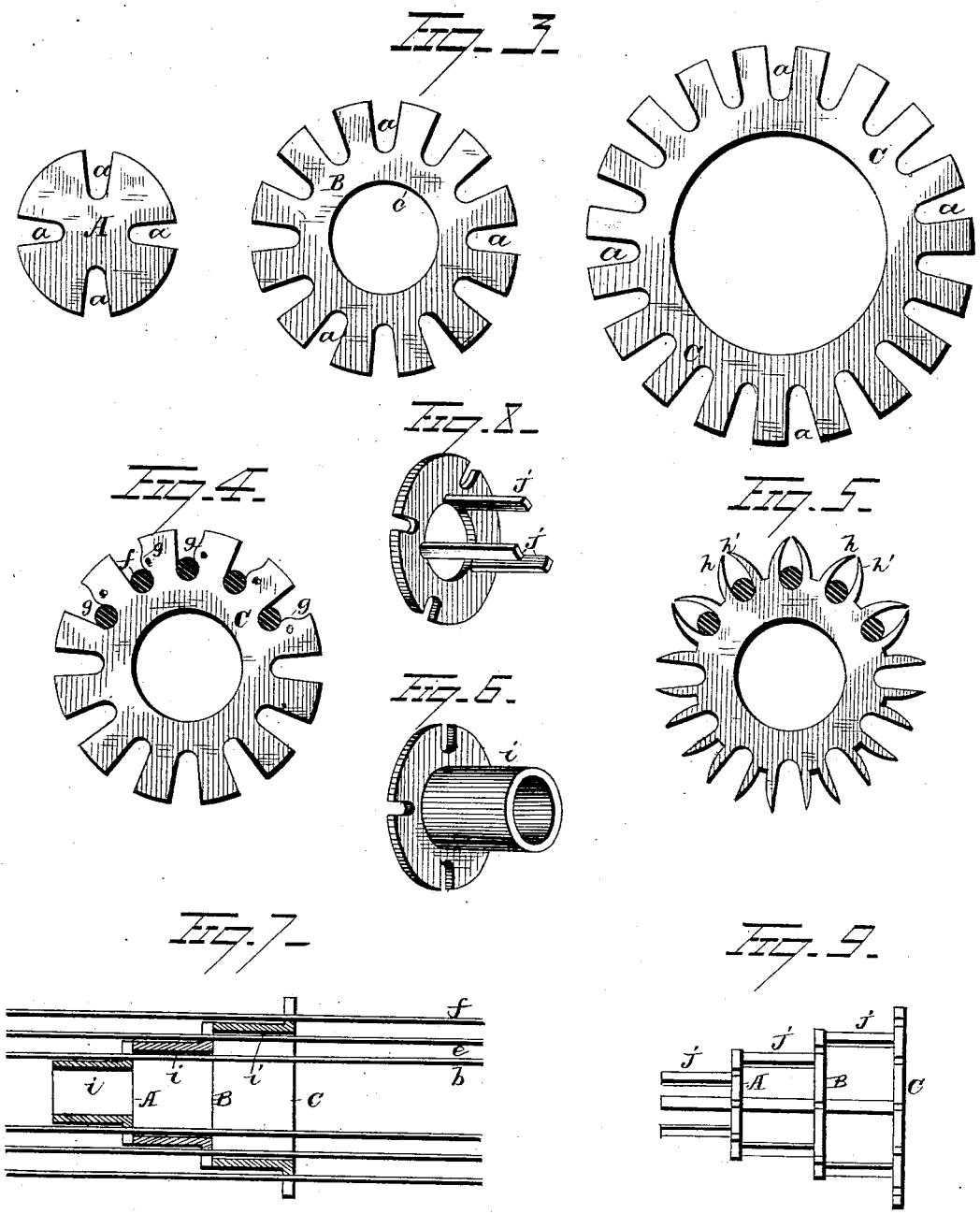

(No Model.) 4 Sheets—Sheet 3.
S. D. STROHM.
ELECTRICAL CABLE.
No. 289,166. Patented Nov. 27, 1883.
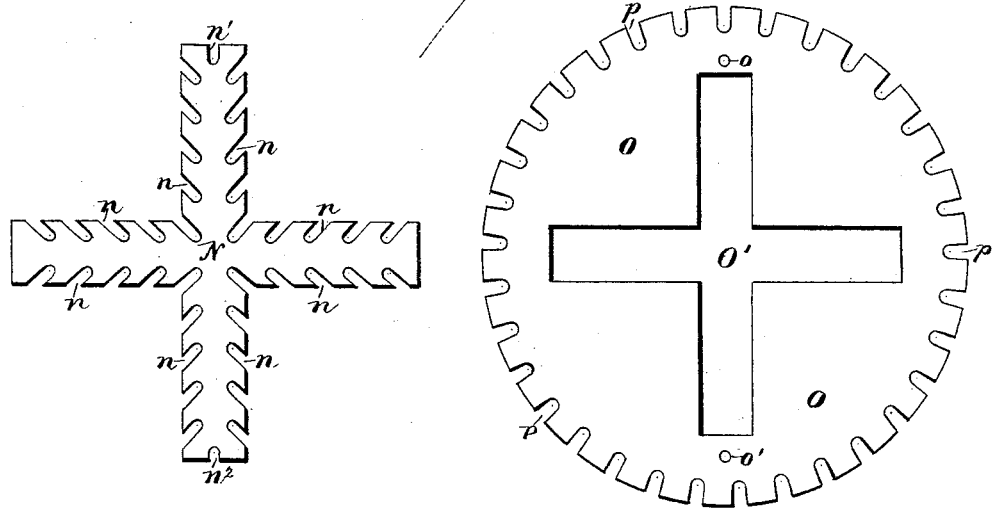
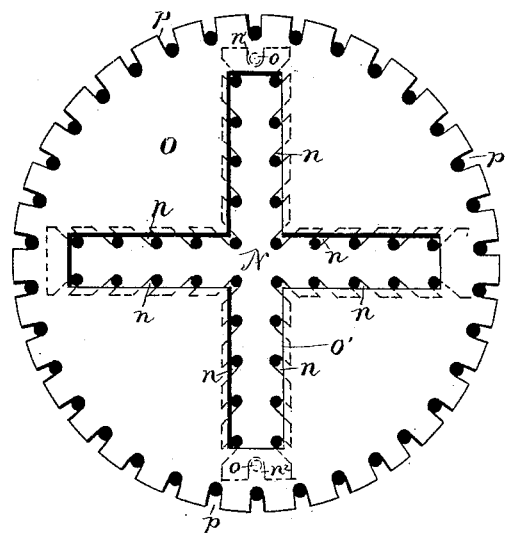
WITNESSES
Herman Moran.
A. W. Bright.
INVENTOR
Samuel D. Strohm,
B. P. &a. Seymour,
ATTORNEY (No Model.) 4 Sheets—Sheet 4.
S. D. STROHM.
ELECTRICAL CABLE.
No. 289,166. Patented Nov. 27, 1883.
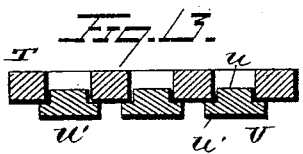
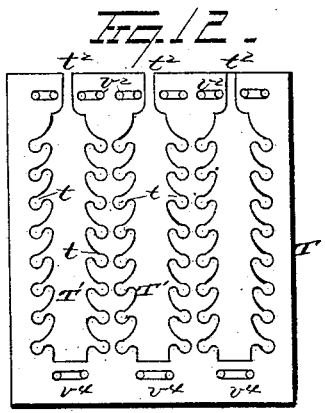
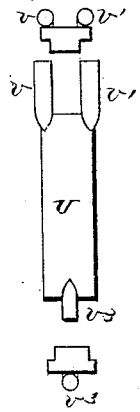
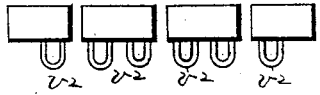
WITNESSES
Herman Moran.
A. W. Bright.
INVENTOR
Samuel D. Strohm.
By H. A. Seymour.
ATTORNEY
N. PETERS. Photo-Lithographer, Washington, D. C.

UNITED STATES PATENT OFFICE.

SAMUEL D. STROHM, OF PHILADELPHIA, PENNSYLVANIA.

ELECTRICAL CABLE.

SPECIFICATION forming part of Letters Patent No. 289,166, dated November 27, 1883.

Application filed September 16, 1881. Renewed April 19, 1883. (No model.)

*To all whom it may concern:*

Be it known that I, SAMUEL D. STROHM, of Philadelphia, in the county of Philadelphia and State of Pennsylvania, have invented certain new and useful Improvements in Electric Cables; and I do hereby declare the following to be a full, clear, and exact description of the invention, such as will enable others skilled in the art to which it pertains to make and use the same.

My invention relates to an improvement in electric conductors, the object being to provide a cable which shall be simple and economical in its construction, one that shall comprise any desired number of separate conductors or sets of conductors, and a cable wherein the wires or conductors may be readily secured in place and be prevented against displacement or the contact of one wire with another.

With these ends in view my invention consists in an electric cable consisting, essentially, of a series of wires and insulated disks, rings, or supports having open slots for the reception and support of the wires, and suitable supports or devices constructed and arranged to engage with the wires and prevent their displacement from the slots in which they are located.

My invention further consists in an electric conductor consisting of two or more series or sets of wires or conductors and separate or independent insulated disks, rings, or supports provided with open slots for the reception of the wires, the rings or disks supporting one series of wires serving to prevent the displacement of the wires composing the next inner set.

My invention further consists in certain other features of construction and combinations of parts, as will hereinafter be described, and pointed out in the claims.

In the accompanying drawings, Figure 1 is a transverse section of a cable embodying my invention. Fig. 2 is a longitudinal section. Fig. 3 shows a detached view of the rings or disks, and Figs. 4, 5, 6, 7, 8, 9, 10, 11, 12, 13, 14, 15, and 16 are modifications.

A B C represent rings or disks, each provided with open slots $a$. The rings or disks may be made of porcelain or any non-conducting material, or may be made of metal or other substance or material coated or covered with any non-conducting substance.

A is the small or inner disk, and is provided with four open slots, $a$, which are of proper width to receive the wires $b$ snugly therein. The next disk or ring, B, is slipped over the wires $b$, and as the inner periphery, $c$, of the ring bears upon the wires $b$ the latter are prevented from becoming displaced from their retaining-slots $a$. In the outer periphery of the annular disk or ring B are formed any desired number of open slots $a$, within which are inserted the wires $e$, which constitute, in the present instance, the middle set of conductors. After all of the wires $e$ have been inserted the outer ring or support, C, is slipped over the wires $e$ and serves to prevent their displacement. The outer periphery of the ring C is provided with a number of open slots $a$, within which are inserted the wires $f$, which constitute the outer set of conductors, and the latter may be retained in place by means of any non-conducting material inserted in the outer ends of the slots; or an open ring, E, may be clasped around the outer wires. In the event that the rings or disks are made of metal, the walls of the slots in the outer ring or disk, C, may be upset, as at $g$, Fig. 4, which operation may be effected by a suitable tool; or, instead of making the periphery of the outer ring circular in form, it may be made pointed, as represented in Fig. 5, and the prongs $h$ $h'$, forming the walls of each slot, be forced toward each other, thus closing the slot and preventing the displacement of the wires. The disks or rings may be made, as illustrated in Figs. 6 and 7, with laterally-projecting flanges $i$, serving to maintain the rings at any desired distance apart, and also holding the wires in place. Instead of forming the spacing-flanges $i$ cylindrical, they may be made in the form of legs, as at $j$ in Figs. 8 and 9. If the annular disks or rings are made of flexible material, they may be split and the ends separated to allow of the insertion of the next inner set of conductors; or the ring may be first made of larger diameter and then split and coiled into the form of a spiral or screw, thus allowing it to be readily placed around the inner set of wires without disturbing them. This would facilitate the first construction of the cable, and, further, would allow of the unlimited increase of the capacity of a small cable. The rings or supports may be made round, square, hexagonal, or other shape, and may be flat, concave, convex, or of other form. The cable may be coated with any insulating material or compound, and used within a tube or pipe; or it may be employed as a regular cable without an inclosing-pipe. It will be observed that the conductors can be readily inserted in place, and in the event that any one of the conductors should become impaired it may be readily removed and repaired. The supporting disks or rings allow the cable to be bent at any desired angle without danger of impairing its efficiency.

In Fig. 1 I have shown the outer covering of the cable, as at M, which may be made of fibrous material impregnated with any suitable waterproofing material, or may be made in any desired manner. Instead of covering the wires and supports to form a cable, they may be inclosed in a tube or pipe, as hereinbefore stated.

In Fig. 10 I have shown another form of supports. N represents a cross provided with open slots $n$ for the reception of wires, and O is a disk, the central portion of which is cut out in the form of a cross, as at O'. After the wires have been inserted in the slots $n$ the disk O is slipped over the wires, as illustrated in Fig. 11, and as the space between the walls of the slots in the disk O is less than the width of the arm of the cross N the adjacent edges of the cross-shaped slot in the disk will prevent the wires from being displaced from their slots. In order to prevent the cross N from being twisted out of place, the upright portion may be slotted at its ends $n'$ $n^2$, which will receive pins or studs $o$ $o'$ on the disk O, and thus retain the parts in place. The disk O has its periphery provided with slots $p$, for the reception of an outer series of wires.

Figs. 12, 13, 14, 15, and 16 represent another form of support, the same consisting of the plate T, formed with the slots T', the edges of which are provided with slots $t$, for the reception of the wires, the latter being inserted through its narrow slots or passages $t^2$ in one side of the plate. U are retaining-pieces consisting of the portions $u$, which fit within the slots T', and the portion $u'$, that overlaps the slotted portions of the plate. The retaining-pieces are secured in place by means of the prongs $v$ $v'$ at their upper ends fitting into staples $v^2$ in the plate T, and prong $v^3$ fitting within a staple, $v^4$, attaching to the lower side of the plate or support T. It will be readily understood that after the wires have been inserted in the slots and the retaining-pieces U secured in place all displacement of the wires will be prevented.

I am aware that electric conductors have been constructed of several series of bed-pieces grooved horizontally and placed one on top of the other; also that an electric conductor has been made of a pipe having connected disks inserted therein, said disks having grooves formed in their peripheries and a single series of wires retained within said grooves, and hence I would have it understood that I make no claim to such forms of construction.

Having fully described my invention, what I claim as new, and desire to secure by Letters Patent, is—

1. An electric cable consisting of two or more series of wires, one series being located within another series, and independent insulated disks, rings, or supports provided with open slots in their outer or inner peripheries for the reception of the wires, and separate disks, rings, or supports, constructed substantially as described, and adapted to engage with a series of the wires and prevent their displacement from their retaining-slots, substantially as set forth.

2. An electric cable consisting of two or more series of wires, one series being encircled by another series, and rings or disks provided with open slots for the reception of the wires, the rings, disks, or supports of the outer series or set of wires being constructed to engage with the wires of the next inner series and prevent their displacement from their slots, substantially as set forth.

3. An electric cable consisting of two or more series of wires, and rings, disks, or supports provided with open slots in their peripheries, of outer disks, rings, or supports, being constructed substantially as described, so that they may engage the wires retained in the inner disks and prevent their displacement, and a split or open ring or clasp for holding the outer wires in place, substantially as set forth.

In testimony whereof I have signed this specification in the presence of two subscribing witnesses.

SAMUEL D. STROHM.

Witnesses:
HERMAN MORAN,
C. S. DRURY.